United States Patent [19]

Kojima

[11] Patent Number: 5,310,169

[45] Date of Patent: May 10, 1994

[54] VIBRATION ISOLATING APPARATUS

[75] Inventor: Hiroshi Kojima, Yokohama, Japan

[73] Assignee: Bridgestone Corporation, Tokyo, Japan

[21] Appl. No.: 95,539

[22] Filed: Jul. 26, 1993

[30] Foreign Application Priority Data

Jul. 30, 1992 [JP] Japan .................................. 4-203893

[51] Int. Cl.$^5$ ............................................. F16F 13/00
[52] U.S. Cl. .......................... 267/140.14; 267/140.15; 267/219; 188/299
[58] Field of Search ....................... 267/140.12, 140.13, 267/140.14, 140.15, 35, 219, 220; 188/299; 248/550, 562, 566, 536, 538

[56] References Cited

U.S. PATENT DOCUMENTS 5,029,825  7/1991  Doi ................................. 267/140.15
5,180,148  1/1993  Muramatsu ..................... 267/140.14

Primary Examiner—Robert J. Oberleitner
Assistant Examiner—Lee W. Young
Attorney, Agent, or Firm—Oliff & Berridge

[57] ABSTRACT

A vibration isolating apparatus. A first diaphragm and a second diaphragm form portions of partitioning walls of a first sub-liquid chamber and a second sub-liquid chamber, respectively, and are provided so as to permit expansion of the first sub-liquid chamber and the second sub-liquid chamber. A first restricting passage always communicates a main liquid chamber and the first sub-liquid chamber. A second restricting passage is provided so as to permit communication of the main liquid chamber and one of the first sub-liquid chamber and the second sub-liquid chamber and has a smaller liquid transit resistance than that of the first restricting passage. A third restricting passage is provided so as to permit communication of the main liquid chamber and the second sub-liquid chamber and has a smaller liquid transit resistance than that of the second restricting passage. A restricting passage opening and closing device opening and closing the second restricting passage and the third restricting passage in accordance with a frequency of a vibration generated from the vibration generating portion, and is provided such that a first state, in which the second restricting passage is closed and the third restricting passage is open, and a second state, in which the third restricting passage is closed and the second restricting passage is open, are possible.

20 Claims, 5 Drawing Sheets

VIBRATION ISOLATING APPARATUS

BACKGROUND OF THE INVENTION

1. Field of Invention

The present invention relates to a vibration isolating apparatus which is used in an engine mount or the like of a vehicle and which damps and absorbs vibrations from a vibration generating portion.

2. Description of the Related Art

In automobile engines, a vibration isolating apparatus serving as an engine mount is disposed between the engine and the vehicle body. The vibration isolating apparatus prevents vibration of the engine from being transferred to the vehicle body.

As this type of vibration isolating apparatus, a vibration isolating apparatus having three restricting passages is known. The first restricting passage absorbs shake vibration (e.g., vibration of a frequency of less than 15 Hz). The second restricting passage has lower transit resistance than the first restricting passage, and absorbs idle vibration (e.g., vibration of a frequency of 15 to 30 Hz). The third restricting passage has lower transit resistance than the second restricting passage, and absorbs shaking sounds (e.g., vibration of 60 to 200 Hz) which are of a higher frequency range than idle vibration.

The vibration isolating apparatus is provided with an opening and closing member controlled by a control means. The opening and closing member is controlled by the controlling means, in accordance with the frequency of the vibration generated by the vibration generating portion, so as to be set in a first state, in which the second restricting passage is closed and the third restricting passage is open, and a second state, in which the third restricting passage is closed and the second restricting passage is open, and a third state, in which both the second restricting passage and the third restricting passage are closed.

In the above-described vibration isolating apparatus, when idle vibration of a low frequency range is generated by the vibration generating portion, the opening and closing member is set in the second state. In this state, liquid passes through the second restricting passage and moves reciprocally between a main liquid chamber and an sub-liquid chamber. Accordingly, vibrations generated by the vibration generating portion are absorbed by liquid-column resonance of the liquid in the second restricting passage.

When vibration of a high frequency range is generated by the vibration generating portion, the opening and closing member is set in the first state. In this state, the liquid passes through the third restricting passage and moves reciprocally between the main liquid chamber and the sub-liquid chamber. Accordingly, vibrations generated by the vibration generating portion are absorbed by liquid-column resonance of the liquid in the third restricting passage.

When shake vibration is generated by the vibration generating portion, the opening and closing member is set in the third state. In this state, the liquid passes through the first restricting passage and moves reciprocally between the main liquid chamber and the sub-liquid chamber. Accordingly, vibrations generated by the vibration generating portion are absorbed by resistance when the liquid passes through the first restricting passage and by liquid-column resonance.

When, for example, alternate generation of shaking sounds and shake vibration in the vehicle engine is repeated, each time the vehicle speed and the engine speed vary, the control means must determine, based on the vehicle speed, the engine speed or the like, whether the vibration generated by the vibration generating portion is high frequency vibration or low frequency vibration, and the control means must control the opening and closing member to be set in the first state or the third state. A drawback arises in that control of the opening and closing member is complicated.

Further, when shaking sound and shake vibration are generated repeatedly in short cycles, it is difficult to reliably drive the opening and closing member synchronously with the cycles.

SUMMARY OF THE INVENTION

In view of the aforementioned, an object of the present invention is to provide a vibration isolating apparatus which can effectively absorb vibrations of different frequency ranges without complicated driving of the opening and closing member.

The present invention is a vibration isolating apparatus having: a first mounting member connected to one of a vibration generating portion and a vibration receiving portion; a second mounting member connected to another of the vibration generating portion and the vibration receiving portion; an elastic body provided between the first mounting member and the second mounting member, and deforming when vibration is generated; a main liquid chamber, at least a portion of a partitioning wall of which being defined with the elastic body, the main liquid chamber is able to expand and contract; a first sub-liquid chamber separated from the main liquid chamber, and able to expand and contract; a second sub-liquid chamber separated from the main liquid chamber and the first sub-liquid chamber, and able to expand and contract; a plurality of diaphragms forming respective portions of partitioning walls of the first sub-liquid chamber and the second sub-liquid chamber, and provided so as to permit expansion of the first sub-liquid chamber and the second sub-liquid chamber; a first restricting passage which always communicates the main liquid chamber and the first sub-liquid chamber; a second restricting passage which is provided so as to permit communication of the main liquid chamber and one of the first sub-liquid chamber and the second sub-liquid chamber and whose liquid transit resistance is smaller than a liquid transit resistance of the first restricting passage; a third restricting passage which is provided so as to permit communication of the main liquid chamber and the second sub-liquid chamber and whose liquid transit resistance is smaller than the liquid transit resistance of the second restricting passage; and restricting passage opening and closing means for opening and closing the second restricting passage and the third restricting passage in accordance with a frequency of a vibration generated from the vibration generating portion, the restricting passage opening and closing means being provided such that a first state, in which the second restricting passage is closed and the third restricting passage is open, and a second state, in which the third restricting passage is closed and the second restricting passage is open, are possible.

In accordance with the present invention as described above, there are provided the main liquid chamber, the first sub-liquid chamber, and the second sub-liquid chamber. The main liquid chamber and the first sub-liquid chamber are communicated by the first restricting passage. Further, the first sub-liquid chamber and the main liquid chamber are communicated by the second restricting passage. The main liquid chamber and the second sub-liquid chamber are communicated by the third restricting passage.

When vibration of a relatively high frequency range among low frequencies is generated, the restricting passage opening and closing means is set in the second state, i.e., in the state in which the third restricting passage is closed and the second restricting passage is open. In this state, the first restricting passage is clogged, and the liquid passes through the second restricting passage, whose transit resistance is smaller than that of the first restricting passage, and moves reciprocally between the main liquid chamber and the first sub-liquid chamber. Vibration of a relatively high frequency range among low frequencies is absorbed by liquid-column resonance of the liquid in the second restricting passage.

When high frequency vibration is generated by the vibration generating portion, the restricting passage opening and closing means is set in the first state by the driving means. Namely, the second restricting passage is closed, and the third restricting passage is open. In this state, the first restricting passage is clogged, and the liquid passes through the third restricting passage, whose transit resistance is lower than that of the first restricting passage, and moves reciprocally between the main liquid chamber and the second sub-liquid chamber. The second sub-liquid chamber is expanded and contracted by the deformation of the second diaphragm which is more rigid than the first diaphragm with respect to liquid pressure. Accordingly, high frequency vibration is absorbed by liquidcolumn resonance of the liquid in the third restricting passage.

Further, when vibration of a relatively low frequency range among low frequencies is generated by the vibration generating portion, the restricting passage opening and closing means remains in the first state. In this case, because the second diaphragm is more rigid than the first diaphragm with respect to liquid pressure, the expansion and contraction of the second sub-liquid chamber is suppressed by the deformation of the second diaphragm. The liquid passes through the first restricting passage, whose transit resistance is higher than that of the third restricting passage, and moves reciprocally between the main liquid chamber and the first sub-liquid chamber. Vibration of a relatively low frequency range among low frequencies is absorbed by resistance when the liquid passes through the first restricting passage and by liquid-column resonance. In this case, if high frequency vibration is generated again by the vibration generating portion, the first state of the restricting passage opening and closing means is still maintained, and, as described above, high frequency vibration is absorbed by liquid-column resonance of the liquid in the third restricting passage.

Namely, in the vibration isolating apparatus relating to the present invention, even if high frequency vibration and vibration of a relatively low frequency range among low frequencies are generated alternately by the vibration generating portion, both types of vibrations can be absorbed with the restricting passage opening and closing means being maintained in the first state. Accordingly, even if high frequency vibration and vibration of a relatively low frequency range among low frequencies are generated alternately, there is no need to drive the restricting passage opening and closing means each time. Therefore, control of the restricting passage opening and closing means is not complicated.

Due to the above-described structure of the vibration isolating apparatus of the present invention, a superior effect is achieved in that vibrations of different frequency ranges can be effectively and reliably absorbed without complex control of the restricting passage opening and closing means.

DESCRIPTION OF THE PREFERRED EMBODIMENT

A vibration isolating apparatus relating to a first embodiment of the present invention will be described hereinafter in accordance with FIGS. 1 through 3.

Figure 3:
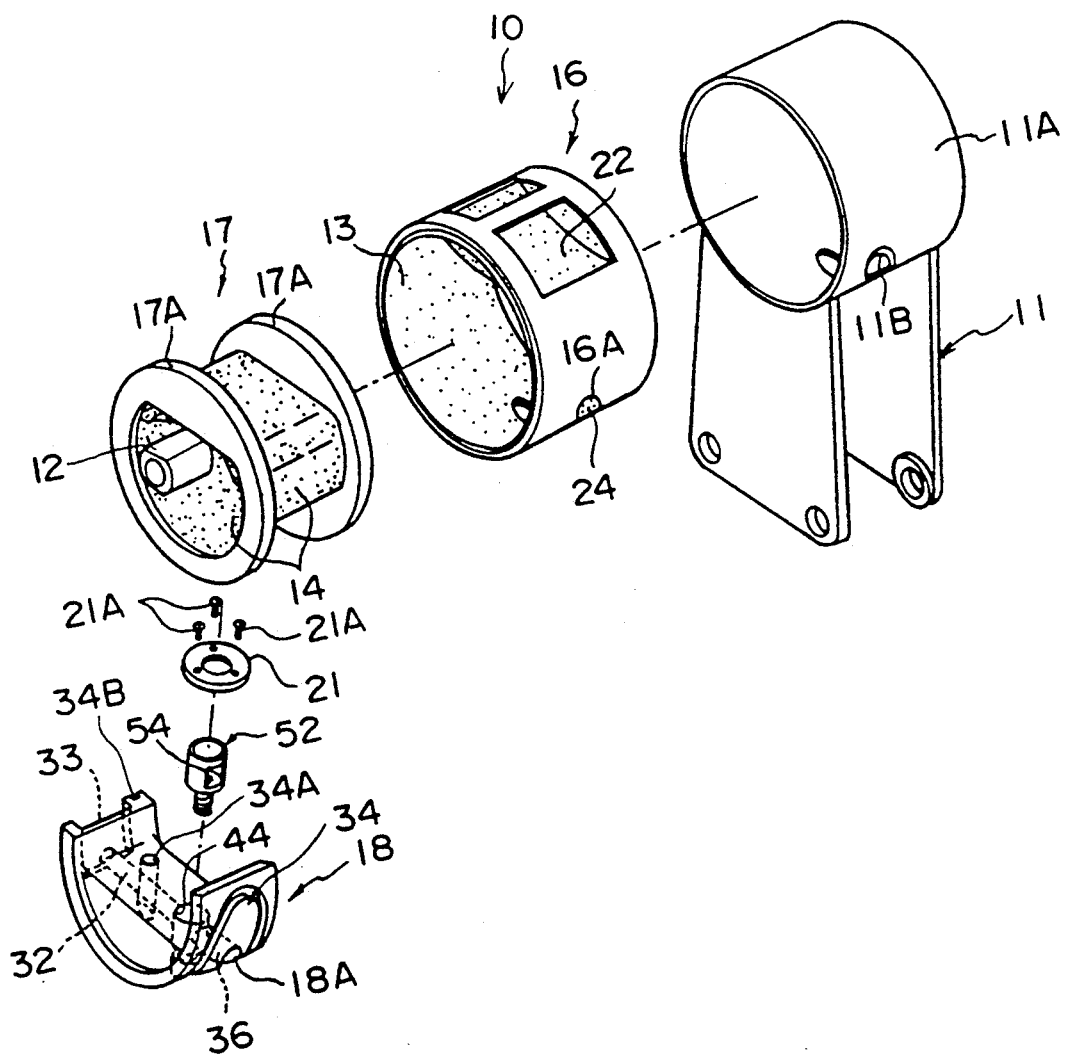
FIG. 3 is an exploded perspective view of the vibration isolating apparatus relating to the first embodiment.

As illustrated in FIG. 3, a vibration isolating apparatus 10 is mounted in a state in which a cylindrical outer cylinder 16 is inserted in an annular portion 11A of a mounting frame 11 used to mount the vibration isolating apparatus 10 to a vehicle body which is a vibration receiving portion. The vibration isolating apparatus 10 includes a cylindrical inner cylinder 12. The axis of the inner cylinder 12 and the axis of the outer cylinder 16 are substantially parallel. In the present embodiment, the inner cylinder 12 is connected to an unillustrated engine which serves as a vibration generating portion.

A thin rubber layer 13 is bonded by vulcanization to the inner side of the outer cylinder 16. A portion of the thin rubber layer 13 is separated from the inner circumferential surface of the outer cylinder so as to form a first diaphragm 22. Intermediate blocks 17, 18 are inserted at the inner side of the thin rubber layer 13 in the radial direction of the outer cylinder 16.

Figure 1:
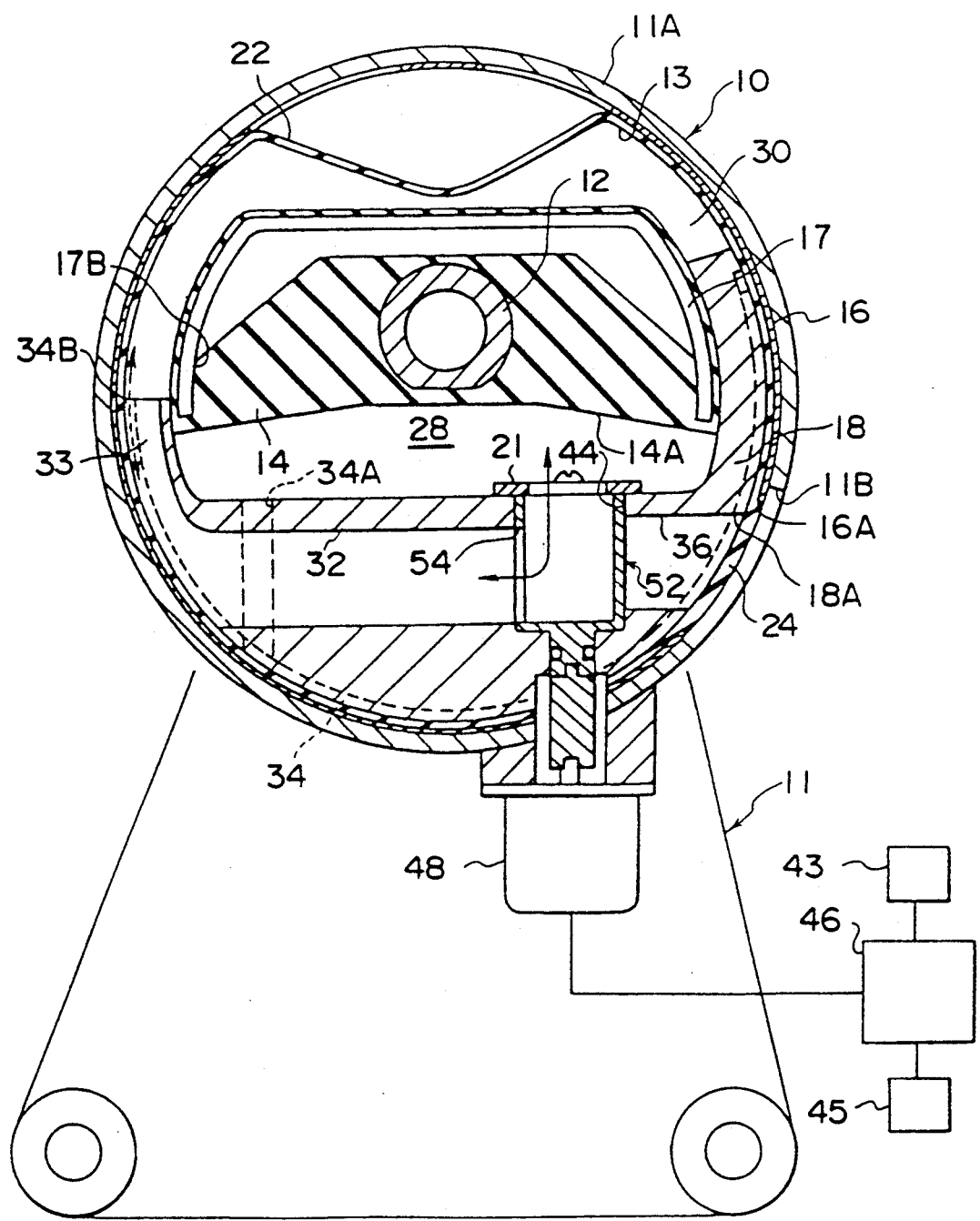
FIG. 1 is a sectional view of a vibration isolating apparatus relating to a first embodiment of the present invention.
Figure 2:
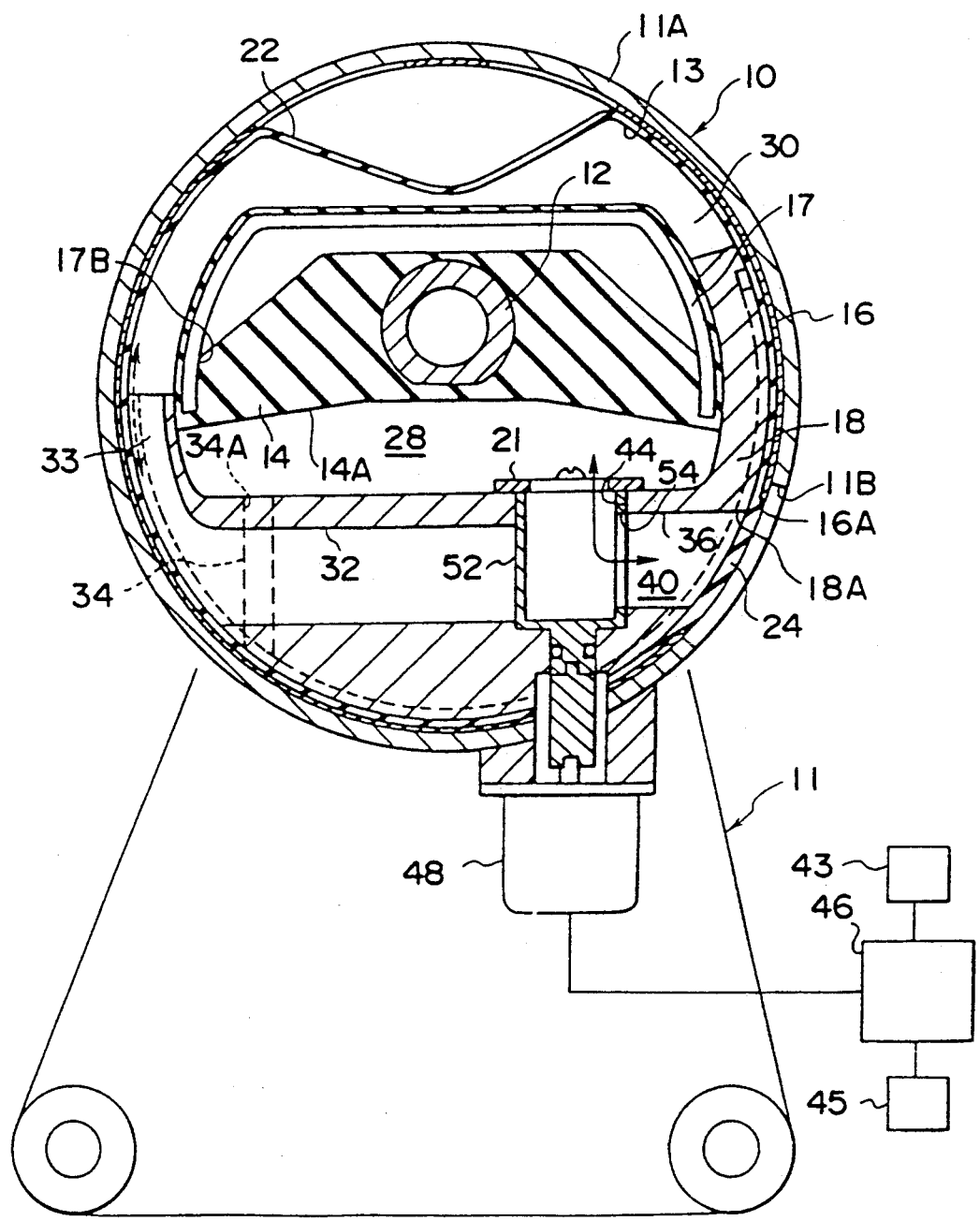
FIG. 2 is an operational view of FIG. 1.

As shown in FIG. 1, the intermediate block 18 is formed as a substantially semicircular block shape as seen in the axial direction of the outer cylinder 16. The outer circumferential surface of the intermediate block 18 is fit tightly to the inner circumferential surface of the thin rubber layer 13. Further, as illustrated in FIG. 3, flange portions 17A are formed at both axial direction end portions of the intermediate block 17. The outer circumferential surfaces of the flange portions 17A are fit tightly to the thin rubber layer 13. The intermediate block 18 is fit between the flange portions 17A. As can be seen in FIG. 1, a cut-out portion 17B is formed in a central portion of the intermediate block facing the intermediate block 18. The cut-out portions 17B penetrates through the inner cylinder 12. A rubber main body 14 is disposed between the intermediate block 17 and the inner cylinder 12. Accordingly, the inner cylinder 12 can move relatively to the outer cylinder 16.

The rubber main body 14 is bonded by vulcanization to the are-shaped portion of the intermediate block 18. A cutout portion 14A is formed in a portion of the intermediate portion of the rubber main body 14. A main liquid chamber 28 is formed between the cut-out portion 14A and the intermediate block 18. Further, a first sub-liquid chamber 30 is formed between the flange portions 17A of the intermediate block 17 and is defined by the intermediate block 17, the thin rubber layer 13 and the first diaphragm 22. The main liquid chamber 28 and the first sub-liquid chamber 30 are filled with liquid such as oil, water, or the like.

A circular hole 44 is formed in the intermediate block 18 in the radial direction of the outer cylinder 16 so as to face the main liquid chamber 28. Further, passages 32 and 36 are provided in the intermediate block 18 and are directed outwardly in the radial direction of the circular hole 44. One end of the passage 32 communicates with the side surface of the circular hole 44, and the other end communicates with a passage 33 formed in the outer circumferential surface of the intermediate block 18. The passage 33 communicates with the first sub-liquid chamber 30.

One end of the passage 36 communicates with the side surface of the circular hole 44, and the other end opens at the outer circumferential surface of the intermediate block 18. As shown in FIGS. 1 and 2, this opening 18A opposes a circular hole 16A, which is formed so as to penetrate through the circumferential wall of the outer cylinder 16, and opposes, via the thin rubber gum 13, a circular hole 11B, which is formed coaxially with the circular hole 16A so as to penetrate the circumferential wall of the annular portion 11A of the mounting frame 11. As illustrated in FIG. 1, the thin rubber layer 13 is formed thickly at an area opposing the through-hole 16A of the outer cylinder 16 so as to form a second diaphragm 24. The second diaphragm 24 closes the opening 18A of the passage 36. The second diaphragm 24 is more rigid than the first diaphragm 22 with respect to liquid pressure.

The sectional area of the passage 36 (hereinafter, "passage sectional area") in a direction orthogonal to the longitudinal direction (the longitudinal direction is the direction in which the liquid flows) is smaller than the passage sectional area of the passage 32. Further, the longitudinal direction dimension of the passage 36 is smaller than that of the passage 32, and the transit resistance of the passage 36 is greater than that of the passage 32. In the present embodiment, the passage sectional area of the passage 32 is formed so as to absorb vibration in a relatively high frequency range among low frequencies (i.e., idle vibration). The passage sectional area of the passage 36 is formed so as to effectively absorb high frequency vibrations (i.e., shaking sounds).

A rotor 52 is inserted into the circular hole 44. A portion of the rotor 52 penetrates through the outer cylinder 16. The rotor 52 receives driving force from a motor 48 mounted to the outer circumference of the outer cylinder 16, and can be rotated thereby. The motor 48 is connected to a control means 46. A vehicle speed sensor 43, which detects the speed of the vehicle, and an engine speed sensor 45, which detects the speed of the engine, are connected to the control means 46. An annular washer 21, which prevents the rotor 52 from falling out, is screwed to a vicinity of the opening portion of the circular hole 44 by screws 21A.

The end portion of the rotor 52 which is inserted into the circular hole 44 is cylindrical. A through-hole 54 is formed in a portion of the cylindrical, circumferential surface of this end portion of the rotor 52. Due to the rotational position of the rotor 52, the through-hole 54 may be positioned in the state illustrated in FIG. 1 in which the through-hole 54 communicates only with the passage 32 (i.e., a second state), and the state illustrated in FIG. 2 in which the through-hole 54 communicates only with the passage 36 (i.e., a first state).

A passage 34 is formed in the intermediate block 18. The passage sectional area of the passage 34 is smaller than the respective passage sectional areas of the passages 32 36. The length of the passage 34 in the longitudinal direction thereof (i.e., the direction in which the liquid passes) is longer than the respective lengths of the passages 32, 36. Further, the transit resistance of the passage 34 is greater than the respective transit resistances of the passages 32, 26. Accordingly, the passage 34 can effectively absorb vibrations of a relatively low frequency range among low frequencies (i.e., shake vibrations).

One end portion 34A of the passage 34 is open at the surface of the intermediate block 18 corresponding to the main liquid chamber 28, and communicates with the main liquid chamber 28. The other end portion 34B of the passage 34 communicates with the first sub-liquid chamber 30. The passage 34 extends downward in FIG. 1 from the one end portion 34A, penetrates through the intermediate block 18, and extends along the peripheral portion of the outer circumference of the intermediate block 18 to the other end portion 34B.

In the second state in which the passage 36 is communicated by the through-hole 54 of the rotor 52 and the passage 32 is closed by the circumferential wall of the rotor 52, the passage 36 forms a second sub-liquid chamber 40 which communicates with the main liquid chamber 28 via the interior of the rotor 52. When liquid moves reciprocally between the circular hole 44 and the passage 36, the second diaphragm 24 is deformed, and the second subliquid chamber 40 expands and contracts. At this time, the interior of the rotor 52 functions as a restricting passage which absorbs shaking sounds.

An air chamber is provided between the first diaphragm 22 and the outer cylinder 16 and is communicated with the exterior of the vibration isolating apparatus 10 as occasion demands.

Next, operation of the first embodiment will be explained.

When the vehicle is idling or traveling at speeds of about 5 km/h, vibration of a relatively high frequency range among low frequencies is generated (idle vibration). Due to the vehicle speed sensor 43 and the engine speed sensor 45, the control means 46 determines whether the vibration currently being generated is idle vibration. If it is determined that idle vibration is being generated, the rotor 52 is rotated, and the main liquid chamber 28 and the passage 32 are communicated by the through-hole 54. The motor 48 is controlled to reach a position (i.e., the position in FIG. 1) at which the passage 36 does not communicate with the main liquid chamber 28 due to the outer circumferential surface of the rotor 52. As a result, the liquid passes through the passage 32 and moves reciprocally between the main liquid chamber 28 and the first sub-liquid chamber 30. Liquid-column resonance is generated in the passage 32, and the idle vibration is absorbed.

Further, when the vehicle speed increases and the vehicle travels at speeds of, for example, 40 to 70 km/h, vibration in a high frequency range (i.e., shaking sounds) is generated. Due to the vehicle speed sensor 43 and the engine speed sensor 45, the control means 46 determines whether shaking sounds are being generated. If it is determined that shaking sounds are being generated, the rotor 52 is rotated, and the main liquid chamber 28 and the passage 36 are communicated by the through-hole 54. The motor 48 is controlled to reach a position (i.e., the position in FIG. 2) at which the passage 32 does not communicate with the main liquid chamber 28 due to the outer circumferential surface of the rotor 52.

When shaking sounds are generated, the passage 34 which has large transit resistance becomes clogged, and the liquid moves reciprocally between the main liquid chamber 28 and the second sub-liquid chamber 40 via the rotor 52. Namely, the second diaphragm 24 deforms, and the second sub-liquid chamber 40 expands and contracts. As a result, liquid-column resonance is generated in the rotor 52, and the shaking sounds are absorbed.

When the vehicle speed is increased even more and the vehicle travels at speeds of, for example, 70 to 80 km/h, vibration of a relatively low frequency range among low frequencies is generated (i.e., shake vibration). Due to the vehicle speed sensor 43 and the engine speed sensor 45, the control means 46 determines whether shake vibration is being generated. If it is determined that shake vibration is being generated, the rotor 52 is maintained at the second position. As a result, the liquid passes through the passage 34 and moves reciprocally between the main liquid chamber 28 and the first sub-liquid chamber 30. In this case, because the second diaphragm 24 has high rigidity, the second sub-liquid chamber 40 hardly expands or contracts, and most of the liquid flows through the passage 34. The shake vibration is absorbed by resistance when the liquid passes through the passage 34 or by liquid-column resonance. In the above-described embodiment, when the through-hole 54 of the rotor 52 is at the position facing the passage 36, the main liquid chamber 28 and the second sub-liquid chamber 40 communicate via the passage 36. Further, in this state, the passage 34 always communicates the main liquid chamber 28 and the first sub-liquid chamber 30. Therefore, shake vibration and high frequency vibration can be absorbed without driving the rotor 52. Further, in the above embodiment, even if shake vibration and shaking sounds are generated by variations in the vehicle speed or the like, there is no need to control the rotor 52 to a first state and a third state. Therefore, control of the rotor 52 is not complicated.

Figure 4:
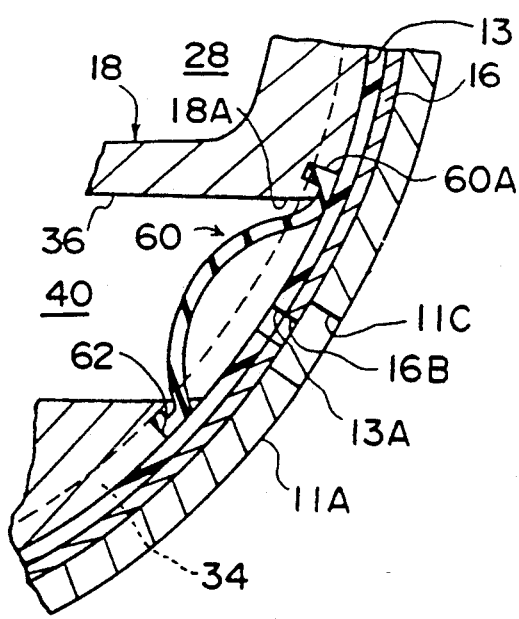
FIG. 4 is a sectional view of a vibration isolating apparatus relating to a second embodiment.

A vibration isolating apparatus relating to a second embodiment of the present invention will now be described with reference to FIG. 4 in which the passage 36 is enlarged. In FIG. 4, members which are the same as those in the first embodiment are denoted with the same reference numerals, and description thereof is omitted.

In the second embodiment, a second diaphragm 60 and the thin rubber layer 13 are provided separately. Namely, peripheral portions 60A of the second diaphragm 60 are fit into insertion holes 62 formed at the passage 36 of the intermediate block 18 in a vicinity of the opening 18A. In this state, the peripheral portions 60A are fit between the intermediate block 18 and the thin rubber layer 13. Accordingly, the second diaphragm 60 closes the opening 18A of the passage 36. Further, air holes 11C, 16B, 13A, which are used for air ventilation, are formed coaxially in the annular portion 11A of the mounting frame 11, the outer cylinder 16, and the thin rubber layer 13, respectively, at positions opposing the second diaphragm 60.

Operation of the second embodiment is basically the same as that of the first embodiment. Namely, when vibration of a relatively high frequency range among low frequencies is generated (idle vibration), liquid-column resonance is generated in the liquid in the passage 32 (see FIG. 1), and the idle vibration is absorbed. Further, when vibration of a high frequency range is generated (shaking sounds), the passage 34 becomes clogged. Accordingly, the liquid moves reciprocally between the main liquid chamber 28 and the second sub-liquid chamber 40 via the rotor 52. As a result, the second diaphragm 60 deforms, and the second subliquid chamber 40 expands and contracts. Fluid-column resonance is generated in the liquid in the rotor 52, and vibration in the high frequency range is absorbed.

Even if shake vibration and shaking sounds are generated alternately, the rotor 52 is not driven, and liquid resonance is generated in the liquid in the passage 34 or the rotor 52 in accordance with the shake vibration or the shaking sounds, respectively. Therefore, shake vibration and shaking sounds are absorbed.

Figure 5:
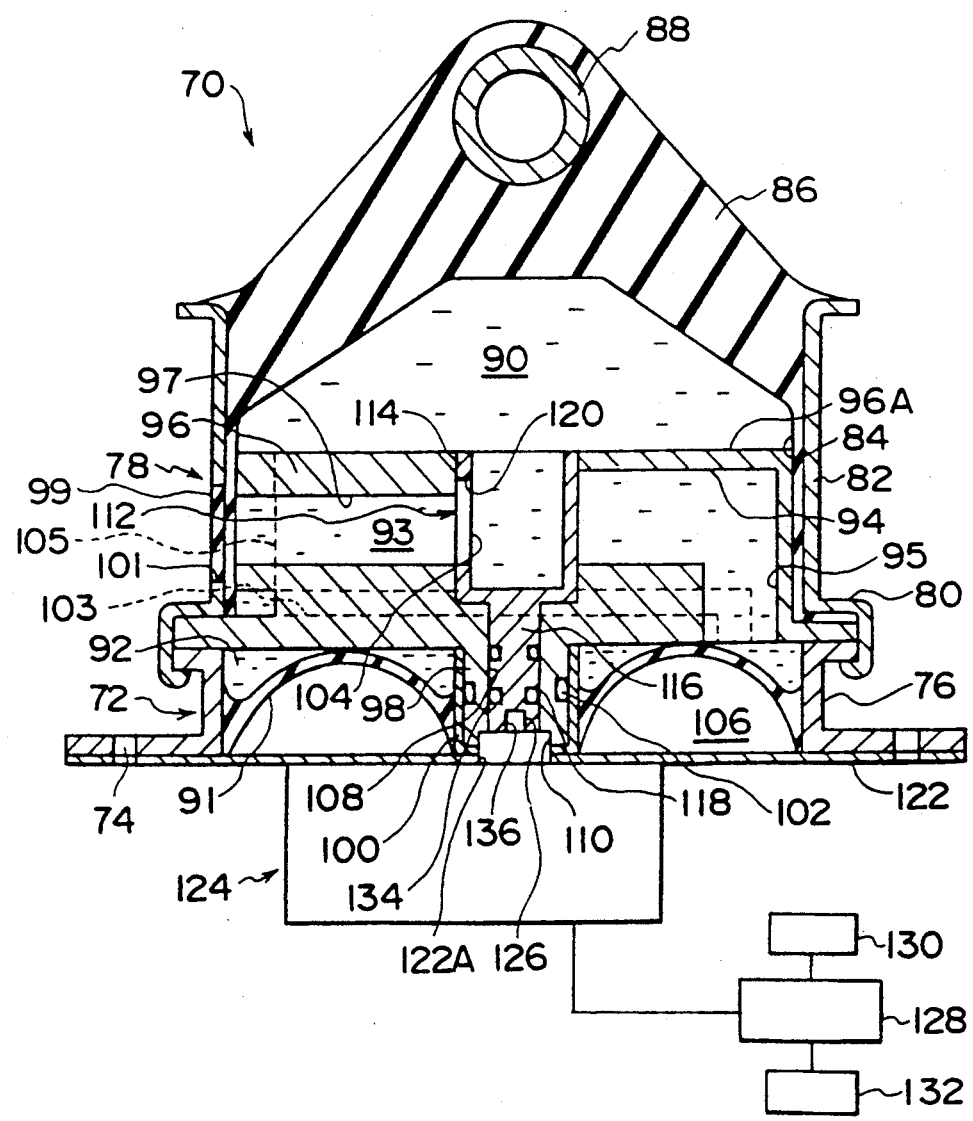
FIG. 5 is a sectional view of a vibration isolating apparatus relating to a third embodiment.

Next, a vibration isolating apparatus relating to a third embodiment of the present invention will be described with reference to FIG. 5.

A ring-shaped bottom plate 72 is formed at a lower portion of a vibration isolating apparatus 70. Bolt holes 74 for fixing the bottom plate 72 to an unillustrated vehicle body are formed in the bottom plate 72. An upright wall 76 is provided at an inner circumferential portion of the bottom plate 72. A supporting body 78 is mounted to the upper edge portion of the upright wall 76. A flange portion 80 is provided at the lower edge portion of the supporting body 78. The flange portion 80 is fixed by caulking to the upper edge portion of the upright wall 76. A supporting cylinder portion 82 rises from the inner circumferential portion of the flange portion 80.

A thin rubber layer 84, which forms the bottom portion of a rubber 86 which is an elastic body, is bonded by vulcanization to the inner circumferential surface of the supporting cylindrical portion 82. An inner cylinder 88 is bonded by vulcanization to the upper portion of the rubber 86. The inner cylinder 88 is joined to an unillustrated engine.

A cylindrical partitioning wall member 96 is fit at the inner circumferential portion of the supporting body 78, and is mounted on the bottom plate 72. The outer circumference of the lower portion of the partitioning member 96 projects outwardly so as to abut the bottom surface of the flange portion 80 and is fixed by caulking to the upper edge portion of the upright wall 76 and to the flange portion 80. A first diaphragm 91 which is an elastic body is bonded by vulcanization to the inner circumferential portion of the upright wall 76. A main liquid chamber 90, a first sub-liquid chamber 92, and a second sub-liquid chamber 93, which are filled with liquid such as water or oil, are provided in regions surrounded by the supporting body 78, the rubber 86, the bottom plate 72 and the first diaphragm 91. The main liquid chamber 90, the first sub-liquid chamber 92, and the second sub-liquid chamber 93 are respectively defined by the partitioning wall member 96.

An axial portion 98 is provided so as to project at a central portion at the bottom surface side of the partitioning member 96. A pipe-shaped member 100 is fit tightly into the axial portion 98. An 0 ring 102 is interposed between the pipe-shaped member 100 and the axial portion 98. The central portion of the first diaphragm 91 is bonded by vulcanization to an outer circumferential portion of the pipe-shaped member 100. A fixed plate 122 is fixed to the bottom surface of the bottom plate 72. An air chamber 106 is provided between the first diaphragm 91 and the fixed plate 122 so as to permit the first diaphragm 91 to deform.

A circular hole 104 is formed in an upper surface portion 96A of the partitioning member 96. A circular through-hole 108, which penetrates the axial portion of the partitioning wall 96 member, is formed coaxially with the circular hole 104 in the bottom surface thereof. Further, a spot facing portion 110 serving as an engaging portion is formed at the lower edge portion of the axial portion 98 of the partitioning wall member 96 coaxially with the circular through-hole 108. A hole portion 122A is formed in the fixed plate 122 so as to oppose the spot facing portion 110. A rotor 112 serving as an opening and closing member is inserted in the circular hole 104 and the circular through-hole 108 so as to be rotatable. A portion of the rotor 112 at the main liquid chamber 90 side is formed as a cylindrical portion 114. A thin axial portion 116, which is inserted into the axial portion 98, is provided integrally with the rotor 112 at the side thereof opposite the main liquid chamber 90. A thin groove portion 118 is formed in the outer circumference of the thin axial portion 116. The 0 ring 102 is fit into the thin groove portion 118.

Further, a through-hole 120, which communicates the interior and the exterior of the cylindrical portion 114, is formed in the cylindrical portion 120. A passage 94 serving as a second restricting passage is formed in the partitioning wall member 96 in the radial direction of the circular hole 104. One end of the passage 94 is open at the inner circumference of the circular hole 104. The other end of the passage 94 communicates with one end of a passage 95 which is formed in the partitioning wall member 96 along the vertical direction. The other end of the passage 95 communicates with the first sub-liquid chamber 92.

A passage 97, which serves as a third restricting passage and whose cross-section is slightly smaller than that of the passage 94, is formed in the partitioning wall member 96 at a position which opposes the passage 94 such that the circular hole 104 is located between the passage 97 and the passage 94. The passage 97 penetrates to the outer circumferential wall of the partitioning wall member 96. An opening 101 is formed in a portion of the supporting cylindrical portion 82 of the supporting body 78. This portion opposes the passage 97 such that the thin rubber layer 84 is located between the opening 101 and the passage 97. A second diaphragm 99 which is an elastic body is bonded by vulcanization to the supporting cylindrical portion 82 so as to cover the opening 101. The second diaphragm 99 is more rigid than the first diaphragm 91 with respect to liquid pressure.

The rotor 112 is rotated by the motor 124 so as to selectively set an arrangement in which the passage 97 and the main liquid chamber 90 are communicated (i.e., the state illustrated in FIG. 5), or an arrangement in which the passage 94 and the main liquid chamber 90 are communicated.

When the rotor 112 is rotated so that the through-hole 120 of the cylindrical portion 114 opposes the passage 94, the main liquid chamber 90 and the first sub-liquid chamber 92 are communicated. Further, when the rotor 112 is rotated so that the through-hole 120 of the cylindrical portion 114 opposes the passage 97, the main liquid chamber 90 and the second sub-liquid chamber 93 are communicated.

A groove-like passage 103 is formed in the outer circumferential surface of the partitioning wall member 96. One end of the passage 103 is open in a vicinity of the partitioning wall member 96 at the passage 95 side and communicates with the first sub-liquid chamber 92. The other end of the passage 103 communicates with the main liquid chamber 90 via a passage 105 which extends vertically. The passage 103 and the passage 105 form the first restricting passage.

A rotational shaft 126 of the motor 124 disposed at the outer side of the fixed plate 122 is fit, via the hole portion 122A of the fixed plate 122 and the spot facing portion 110 of the partitioning wall member 96, into a connecting hole 136 formed at an end of the thin axial portion 116 of the rotor 112. The rotor 112 and the motor 124 are thereby connected.

The motor 124 is connected to a control means 128. The rotation of the motor 124 is controlled by the control means 128. The control means 128 receives detecting signals from at least a vehicle speed sensor 130 and an engine speed sensor 132 so as to detect the vehicle speed and the engine speed.

Operation of the third embodiment will be described hereinafter. When vibration of a relatively high frequency range among low frequencies is generated (i.e., idle vibration), the control means 128 rotates the motor 124 so that the through-hole 120 of the rotor 112 communicates with the passage 94. Accordingly, even if the passages 103, 105 are clogged, the liquid moves reciprocally between the main liquid chamber 90 and the first sub-liquid chamber 92 via the passage 94 which has low transit resistance. Fluid-column resonance is generated in the liquid in the passage 94, and the idle vibration is absorbed.

When shake vibration is generated, the control means 128 operates the motor 124 so that the rotor 112 is rotated and the through-hole 120 is disposed so as to correspond to the passage 97. Accordingly, the passage 94 is closed. The passages 103, 105 communicate the main liquid chamber 90 and the first sub-liquid chamber 92, and the passage 97 communicates with the main liquid chamber 90. As a result, the variation in pressure, which is generated within the main liquid chamber 90 and is based on the engine vibration, is transferred to the liquid passing through the passages 103, 105. The large, inputted shake vibration is absorbed by the resistance of the liquid. Further, the passage 97 communicates with the main liquid chamber 90. Therefore, with regard to high-frequency, low-amplitude vibration generated with the shake vibration, liquid-column resonance is generated in the passage 97, and the dynamic spring constant is decreased.

What is claimed is:
1. A vibration isolating apparatus comprising:
a first mounting member connected to one of a vibration generating portion and a vibration receiving portion;
a second mounting member connected to another of the vibration generating portion and the vibration receiving portion;
an elastic body provided between said first mounting member and said second mounting member, and deforming when vibration is generated;
a main liquid chamber, at least a portion of a partitioning wall of which being defined with said elas- tic body, said main liquid chamber is able to expand and contract;

a first sub-liquid chamber separated from said main liquid chamber, and able to expand and contract;

a second sub-liquid chamber separated from said main liquid chamber and said first sub-liquid chamber, and able to expand and contract;

a plurality of diaphragms forming respective portions of partitioning walls of said first sub-liquid chamber and said second sub-liquid chamber, and provided so as to permit expansion of said first sub-liquid chamber and said second sub-liquid chamber;

a first restricting passage which always communicates said main liquid chamber and said first sub-liquid chamber;

a second restricting passage which is provided so as to permit communication of said main liquid chamber and one of said first sub-liquid chamber and said second sub-liquid chamber and whose liquid transit resistance is smaller than a liquid transit resistance of said first restricting passage;

a third restricting passage which is provided so as to permit communication of said main liquid chamber and said second sub-liquid chamber and whose liquid transit resistance is smaller than the liquid transit resistance of said second restricting passage; and restricting passage opening and closing means for opening and closing said second restricting passage and said third restricting passage in accordance with a frequency of a vibration generated from the vibration generating portion, said restricting passage opening and closing means being provided such that a first state, in which said second restricting passage is closed and said third restricting passage is open, and a second state, in which said third restricting passage is closed and said second restricting passage is open, are possible.

2. A vibration isolating apparatus according to claim 1, wherein said plurality of diaphragms includes a first diaphragm, which is provided in said first sub-liquid chamber, and a second diaphragm, which is provided in said second sub-liquid chamber, said second diaphragm being more rigid than said first diaphragm.

3. A vibration isolating apparatus according to claim 2, wherein said first diaphragm and said second diaphragm are formed integrally.

4. A vibration isolating apparatus according to claim 2, wherein said first diaphragm and said second diaphragm are formed separately.

5. A vibration isolating apparatus according to claim 3, wherein said first mounting member has an opening portion which permits expansion of said second diaphragm when a volume of said second sub-liquid chamber increases.

6. A vibration isolating apparatus according to claim 4, wherein said first mounting member and a thin rubber layer fixed to an inner circumferential portion of said first mounting member have respective opening portions which permit expansion of said second diaphragm when a volume of said second sub-liquid chamber increases.

7. A vibration isolating apparatus according to claim 4, wherein said second diaphragm is provided so as to oppose said second sub-liquid chamber and so as to cover an opening portion provided in said first mounting member.

8. A vibration isolating apparatus according to claim 1, wherein said restricting passage opening and closing means has a hollow rotor which is provided between said second restricting passage and said third restricting passage.

9. A vibration isolating apparatus according to claim 8, wherein said hollow rotor has an opening in a portion of a circumferential wall of said hollow rotor, said opening opposing one of said second restricting passage and said third restricting passage so as to open the restricting passage which is opposed by said opening.

10. A vibration isolating apparatus according to claim 9, wherein said restricting passage opening and closing means has driving means which drives said hollow rotor.

11. A vibration isolating apparatus according to claim 10, wherein said restricting passage opening and closing means has control means, said control means controlling said driving means by detecting a speed of an engine main body which serves as the vibration generating portion and a speed of a vehicle in which said engine main body is installed.

12. A vibration isolating apparatus according to claim 1, further comprising:

a restricting passage forming member provided at an inner side of said first mounting member, and forming said first restricting passage, said second restricting passage and said third restricting passage.

13. A vibration isolating apparatus, comprising:

a first mounting member connected to one of a vibration generating portion and a vibration receiving portion;

a second mounting member provided inwardly of at least one of an outer circumference of said first mounting member and an extended line of the outer circumference of said first mounting member, and connected to another of the vibration generating portion and the vibration receiving portion;

an elastic body provided between said first mounting member and said second mounting member, and deforming when vibration is generated;

a main liquid chamber, at least a portion of a partitioning wall of which being defined with said elastic body, said main liquid chamber is able to expand and contract;

a first sub-liquid chamber separated from said main liquid chamber, and able to expand and contract;

a second sub-liquid chamber separated from said main liquid chamber and said first sub-liquid chamber, and able to expand and contract;

a first diaphragm forming at least a portion of a partitioning wall of said first sub-liquid chamber, and permitting expansion of said first sub-liquid chamber;

a second diaphragm forming at least a portion of a partitioning wall of said second sub-liquid chamber, and permitting expansion of said second sub-liquid chamber, said second diaphragm being more rigid than said first diaphragm;

a first restricting passage which always communicates said main liquid chamber and said first sub-liquid chamber;

a second restricting passage which is provided so as to permit communication of said first sub-liquid chamber and said main liquid chamber and whose liquid transit resistance is smaller than a liquid transit resistance of said first restricting passage;

a third restricting passage which is provided so as to permit communication of said second sub-liquid chamber and said main liquid chamber and whose liquid transit resistance is smaller than the liquid transit resistance of said second restricting passage;

a hollow rotor having an opening in a portion of a circumferential wall of said hollow rotor, said hollow rotor opening one of said second restricting passage and said third restricting passage by rotating around an axis of said hollow rotor;

an intermediate block provided at an inner side of said first mounting member, said intermediate block forming said first restricting passage, said second restricting passage, and said third restricting passage, and holding said hollow rotor such that said hollow rotor is rotatable;

driving means for driving said hollow rotor, in accordance with a frequency of a vibration generated by the vibration generating portion, to one of a first state, in which said opening opposes said third restricting passage so that said third restricting passage is open and said second restricting passage is closed, and a second state, in which said opening opposes said second restricting passage so that said second restricting passage is open and said third restricting passage is closed; and control means for controlling said driving means 14. A vibration isolating apparatus according to claim 13, wherein said first diaphragm and said second diaphragm are formed integrally.

15. A vibration isolating apparatus according to claim 13, wherein said first diaphragm and said second diaphragm are formed separately.

16. A vibration isolating apparatus according to claim 14, wherein said first mounting member has an opening portion which permits expansion of said second diaphragm when a volume of said second sub-liquid chamber increases.

17. A vibration isolating apparatus according to claim 15, wherein said first mounting member and a thin rubber layer fixed to an inner circumferential portion of said first mounting member have respective opening portions which permit expansion of said second diaphragm when a volume of said second sub-liquid chamber increases.

18. A vibration isolating apparatus according to claim 15, wherein said second diaphragm is provided so as to oppose said second sub-liquid chamber and so as to cover an opening portion provided in said first mounting member.

19. A vibration isolating apparatus according to claim 13, wherein said control means has a vehicle speed sensor for measuring the speed of the vehicle.

20. A vibration isolating apparatus according to claim 13, wherein said control means has an engine speed sensor for measuring the speed of said engine main body.

* * * * *